United States Patent Office 3,217,036
Patented Nov. 9, 1965

3,217,036
2-HYDROCARBYLTHIOALKANALDOXIME
COMPOUNDS
Linwood K. Payne, Jr., Charleston, W. Va., assignor to Union Carbide Corporation, a corporation of New York
No Drawing. Filed Sept. 25, 1962, Ser. No. 226,172
2 Claims. (Cl. 260—566)

This invention relates to new chemical compounds useful as nematocides and is particularly concerned with 2-hydrocarbylthioalkanaldoxime compounds.

The novel compounds of this invention are 2-methyl-2-hydrocarbylthiopropionaldoximes wherein the hydrocarbyl moiety is acyclic and contains up to about 10 carbon atoms, inclusive, and preferably contains from 1 to 6 carbon atoms, inclusive, and, most preferably, is free of acetylenic unsaturation. The instant compounds can thus be represented by the general formula (I) 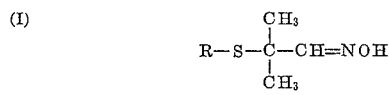

wherein R is acyclic hydrocarbyl of up to 10 carbon atoms, inclusive, and, preferably, where R is acyclic hydrocarbyl free of acetylenic unsaturation, and contains from 1 to 6 carbon atoms, inclusive.

Specifically exemplary of my novel compounds are:
2-methyl-2-methylthiopropionaldoxime,
2-methyl-2-ethylthiopropionaldoxime,
2-methyl-2-n-propylthiopropionaldoxime,
2-methyl-2-isopropylthiopropionaldoxime,
2-methyl-2-n-butylthiopropionaldoxime,
2-methyl-2-sec-butylthiopropionaldoxime,
2-methyl-2-isobutylthiopropionaldoxime,
2-methyl-2-t-butylthiopropionaldoxime,
2-methyl-2-pentylthiopropionaldoxime,
2-methyl-2-hexylthiopropionaldoxime,
2-methyl-2-decylthiopropionaldoxime,
2-methyl-2-vinylthiopropionaldoxime,
2-methyl-2-(1-propenylthio)propionaldoxime,
2-methyl-2-(2-propenylthio)propionaldoxime,
2-methyl-2-(1-butenylthio)propionaldoxime,
2-methyl-2-(2-butenylthio)propionaldoxime,
2-methyl-2-(3-butenylthio)propionaldoxime,
2-methyl-2-(1-pentenylthio)propionaldoxime,
2-methyl-2-(3-pentenylthio)propionaldoxime,
2-methyl-2-(5-hexenylthio)propionaldoxime,
2-methyl-2-(9-decenylthio)propionaldoxime,
2-methyl-2-ethynlthiopropionaldoxime,
2-methyl-2-(1-propynylthio)propionaldoxime,
2-methyl-2-(2-propynylthio)propionaldoxime,
2-methyl-2-(1-butynylthio)propionaldoxime,
2-methyl-2-(2-butynylthio)propionaldoxime,
2-methyl-2-(3-butynylthio)propionaldoxime,
2-methyl-2-(5-hexynylthio)propionaldoxime,
and the like.

My compounds are conventionally prepared from the azodioxy-coupled dimer of 1-nitroso-2-chloro-2-methylpropane,

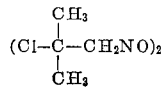

the preparation of which has been described, for example, by Oglobin in J. Gen. Chem. (U.S.S.R.) 22, 2175 (1952) and by Crowder et al. in U.S. Patent 2,394,430.

To obtain the compounds of this invention, the said dimer is reacted with hydrocarbyl mercaptan, R—SH, where R is defined as before, i.e., alkyl, alkenyl, or alkynyl mercaptan at a temperature of from about 20° C. to about 60° C. in the presence of a base. Preferably, equimolar amounts of mercaptan, sodium hydroxide, and dimer are employed. A reaction medium can be prvoided by use of any suitable inert organic solvent such as ethanol. The compounds of this invention are usually recovered as oily liquids by filtration and distillation.

The following examples are illustrative.

EXAMPLE I

*2-methyl-2-methylthiopropionaldoxime*

8 grams (0.17 mole) of methyl mercaptan was reacted with 3.68 grams (0.16 mole) of sodium dissolved in anhydrous ethanol. The resulting sodium mercaptide was then treated with 19.5 grams (0.16 mole) of 2-chloro-2-methyl-1-nitroso-propane dimer dissolved in hot ethanol. The resulting reaction mixture was heated at reflux for five hours, cooled, and filtered. The filtrate was evaporated under reduced pressure and the residue dissolved in diethyl ether. The ether solution was filtered and the solvent removed by evaporation. Distillation of the resulting residue in vacuo yielded 15 grams of a clear liquid, 2-methyl-2-methylthiopropionaldoxime, having a boiling point, after redistillation, of 78–81° C. at 5 mm. Hg. and the following analysis:

Calculated for $C_5H_{11}NOS$: C, 45.08%; H, 8.33%; N, 10.52%. Found: C, 45.89%; H, 8.19%; N, 10.64%.

EXAMPLE II

*2-methyl-2-isopropylthiopropionaldoxime*

To 8 grams (0.2 mole) of sodium hydroxide dissolved in 100 milliliters of anhydrous ethanol was added 15.2 grams (0.2 mole) of 2-propanethiol at 25–30° C. The solution was stirred at 30° C. for thirty minutes and was then treated with 24.3 grams (0.2 mole) of 2-chloro-2-methyl-1-nitrosopropane dimer in small portions. The reaction mixture was allowed to stand overnight at room temperature and was then filtered to remove a precipitated salt. The filtrate was distilled to remove the ethanol solvent and the resulting residue was recrystallized from diethyl ether and distilled to give 19 grams (59 percent of theory of 2-methyl-2-isopropylthiopropionaldoxime as a colorless oil which had a boiling point of 74–76° C. at 2 mm. Hg. and analyzed as follows:

Calculated for $C_7H_{15}NOS$: C, 52.1%; H, 9.4%; N, 8.7%. Found: C, 51.9%; H, 9.1%; N, 8.3%.

EXAMPLE III

*2-methyl-2-(2-propenylthio)propionaldoxime*

To 13.2 grams of 85 percent potassium hydroxide (0.2 mole) dissolved in 100 milliliters of ethanol was added 18.5 grams (0.25 mole) of allyl mercaptan. The mixture was stirred at 30° C. for thirty minutes and then 24.3 g. of 2-chloro-2-methyl-1-nitrosopropane dimer was added in small portions. External cooling was required to maintain the temperature at 30–35° C. The mixture was allowed to stand at room temperature for two days, filtered, the solvent evaporated and the residue distilled. There was obtained 27 grams of 2-methyl-2-(2-propenyl) thiopropionaldoxime as a colorless oil having a boiling point of 75–77° C. at 1 mm. Hg. and the following analysis:

Calculated for $C_7H_{13}NOS$: C, 52.8%; H, 8.4%. Found: C, 52.9%; H, 8.7%.

The compounds of this invention are useful as chemical intermediates to produce bioactive compounds and are themselves useful as pesticides, particularly as nematocides.

As representative of the present invention, 2-methyl-2-methylthiopropionaldoxime was tested against nematodes.

The compound was formulated by dissolving one gram of compound in 50 milliliters of acetone in which had been dissolved 0.1 gram (10 percent of the weight of compound) of "Triton X–155," an alkylphenoxy polyethoxyethanol surfactant, as an emulsifying or dispersing agent. The resulting solution was mixed into 150 milliliters of water to give roughly 200 milliliters of a suspension containing the compound in finely divided form. The thus-prepared stock suspension contained 0.5 percent by weight of compound. The test concentrations employed in the test described hereinbelow was obtained by diluting the stock suspension with water to give a suspension containing 1000 parts of test compound per million parts of final formulation.

NEMATOCIDE TEST PROCEDURE

Infective migratory larvae of the root-knot nematode (*Meloidogyne incognita*, var. acrita), reared in the greenhouse on roots of Coleus plants constituted the test organism. Infected Coleus plants were removed from the culture and the roots were chopped very finely. A small amount of these choppings was added to a pint Mason jar containing approximately 180 cubic centimeters of soil. The jar was capped and incubated for one week at room temperature. During the incubation period eggs of the nematode hatch and the larval forms migrate into the soil. Twenty-five milliliters of the test formulation were added to each of two jars. Thus each jar contained 25 milligrams of test compound, an amount roughly equivalent to 75 pounds per acre. Following the introduction of the test formulation, the jars were capped and the contents thoroughly mixed on a ball mill for five minutes. The jars remained capped at room temperature for 48 hours whereupon the contents were transferred to 3-inch pots. These pots were then seeded with cucumber as an indicator crop and placed in the greenhouse where they were cared for in the usual fashion for approximately three weeks. The cucumber plants were removed from the pots and the soil was washed from the roots. The amount of galling was determined by visual inspection and it was found that application of the test compound resulted in perfect control, i.e., no galling, while a control test resulted in severe galling.

What is claimed is:
1. 2-methyl-2-methylthiopropionaldoxime.
2. 2-methyl-2-(2-propenylthio)propionaldoxime.

References Cited by the Examiner

UNITED STATES PATENTS 2,496,198   1/50   Butterbaugh _____ 260—566
2,786,865   3/57   Copenhaver _____ 260—566

OTHER REFERENCES

Beilstein: "Handbuch Der. Organische Chemie," vol. 1, 3rd supplement, page 3227 (1959).

Conant et al.: "The Chemistry of Organic Compounds," page 335 (1952).

Weiland et al.: Rec. Trav. Chim., vol. 75, pages 1358–1368 (1956).

CHARLES B. PARKER, *Primary Examiner*.